(12) United States Patent
Lombrozo et al.

(10) Patent No.: US 9,879,463 B2
(45) Date of Patent: Jan. 30, 2018

(54) DEVICE AND METHOD FOR POWERED CLOSING OF CAR DOORS

(71) Applicant: Waymo LLC, Mountain View, CA (US)

(72) Inventors: Peter Craig Lombrozo, Santa Cruz, CA (US); Andrew Paul Warburton, Pleasanton, CA (US); Robert John Ellis, Farmington Hills, MI (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 15/054,811

(22) Filed: Feb. 26, 2016

(65) Prior Publication Data
US 2017/0247929 A1    Aug. 31, 2017

(51) Int. Cl.
*E05F 15/02* (2006.01)
*E05F 15/627* (2015.01)
(Continued)

(52) U.S. Cl.
CPC ......... *E05F 15/627* (2015.01); *B60J 5/0486* (2013.01); *E05F 15/70* (2015.01); *E05F 15/79* (2015.01); *E05Y 2900/531* (2013.01)

(58) Field of Classification Search
CPC ......... E05F 15/627; E05F 15/70; E05F 15/79; B60J 5/0486
(Continued)

(56) References Cited

U.S. PATENT DOCUMENTS

| 3,910,625 A | * | 10/1975 | Menard | B60R 5/044 |
| | | | | 242/371 |
| 4,823,059 A | * | 4/1989 | Compeau | E05B 81/22 |
| | | | | 292/341.16 |

(Continued)

FOREIGN PATENT DOCUMENTS

| CA | 2473742 A1 | * | 7/2003 | ............ E05F 1/1091 |
| DE | 102004004957 A1 | * | 8/2005 | ............ E05F 15/627 |

(Continued)

OTHER PUBLICATIONS

Strolz, Michael, "Development, Control, and Evaluation of an Actuated Car Door", Student Member, IEEE, Alexander Mortl, Student Member, IEEE, Michael Graf, and Martin Buss, Member, IEEE, IEEE Transactions on Haptics, vol. 2, No. 3, Jul.-Sep. 2009, 11 pgs.

(Continued)

Primary Examiner — Jerry Redman
(74) Attorney, Agent, or Firm — Lerner, David, Littenberg, Krumholz & Mentlik, LLP

(57) ABSTRACT

The technology relates to assisting in the closing of a vehicle door by automatically pulling a door closed. One or more computing devices having one or more processors may receive, from one or more sensors, information indicating that a door on the vehicle is not closed. In response to the received information indicating that the door is not closed, the one or more computing devices may determine to send a triggering signal to close the door. The one or more computing devices may send the triggering signal to the actuator and the actuator may receive the triggering signal. In response to receiving the triggering signal the actuator may be activated to close the door of the vehicle without user input.

14 Claims, 18 Drawing Sheets

(51) Int. Cl.
*E05F 15/70* (2015.01)
*E05F 15/79* (2015.01)
*B60J 5/04* (2006.01)

(58) Field of Classification Search
USPC ......... 49/333, 334, 335, 338, 339, 340, 341, 49/347, 348, 352
See application file for complete search history.

(56) References Cited

U.S. PATENT DOCUMENTS

| | | | |
|---|---|---|---|
| 4,850,140 A * | 7/1989 | Compeau | E05F 15/627 24/115 F |
| 5,361,612 A * | 11/1994 | Voiculescu | E05B 83/24 242/376 |
| 5,434,487 A | 7/1995 | Long et al. | |
| 5,531,498 A * | 7/1996 | Kowall | E05B 81/22 296/146.4 |
| 6,126,222 A * | 10/2000 | Nguyen | E05C 17/36 16/82 |
| 6,918,210 B1 * | 7/2005 | Smiley | E05F 15/643 49/347 |
| 7,686,378 B2 * | 3/2010 | Gisler | E05F 15/43 296/146.4 |
| 8,234,817 B2 | 8/2012 | Neundorf et al. | |
| 2006/0151231 A1 | 7/2006 | Bucksch et al. | |
| 2007/0271851 A1 * | 11/2007 | Slopack | E05B 17/0029 49/358 |
| 2008/0120911 A1 * | 5/2008 | Browne | E05B 47/0009 49/352 |
| 2015/0283886 A1 | 10/2015 | Nania | |
| 2015/0360616 A1 | 12/2015 | Shami | |
| 2016/0026191 A1 | 1/2016 | Fujimoto et al. | |
| 2017/0030133 A1 * | 2/2017 | Elie | E05F 15/70 |
| 2017/0030137 A1 * | 2/2017 | Elie | E05F 15/77 |

FOREIGN PATENT DOCUMENTS

| | | | |
|---|---|---|---|
| EP | 2210795 B1 | 4/2014 | |
| WO | WO 2005049947 A1 * | 6/2005 | ............ E05F 15/627 |
| WO | WO 2005066441 A1 * | 7/2005 | ............ E05F 15/627 |
| WO | 2015061885 A1 | 5/2015 | |

OTHER PUBLICATIONS

International Search Report and Written Opinion for PCT Application No. PCT/US2017/018886, dated May 25, 2017. 17 pages.

* cited by examiner

DEVICE AND METHOD FOR POWERED CLOSING OF CAR DOORS

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pick up or destination location, and the vehicle maneuvers itself to that location.

During operation of an autonomous vehicle a passenger may neglect to close a door, or fail to fully close the door. As such, the autonomous vehicle may be unable to continue drive until the door is closed. Thus the autonomous vehicle may be stuck at a location until the door is closed.

SUMMARY

Embodiments within the disclosure relate generally to automatically closing the door of a vehicle. One aspect includes a method for automatically closing the door of the vehicle. One or more computing devices may receive, from one or more sensors, information indicating that a door on the vehicle is not closed. The one or more computing devices, in response to the received information indicating that the door is not closed, may determine to send a triggering signal to close the door and send the triggering signal to an actuator. The actuator may receive the triggering signal and in response to receiving the triggering signal, activate the actuator to close the door of the vehicle without user input.

In some embodiments, prior to determining to send the triggering signal, the one or more computing devices may calculate a continuous amount of time the door is not closed.

In some embodiments, the one or more computing devices may determine to send the triggering signal when the time the door was open is greater than a threshold value.

In some embodiments, the one or more computing devices may determine to send the triggering signal when a remote triggering signal is received by the one or more computing devices.

In some embodiments, the one or more computing devices may receive a motor angle reading from a motor angle sensor, and based on the received motor angle sensor reading, determine at least one of a speed the actuator should close the door, the power needed to close the door, and the amount of rotation needed to close the door, and send a control signal to an actuator indicating the speed the actuator should close the door.

In some embodiments, the one or more sensors may include a door angle sensor, and the door angle sensor monitors the position of a pulley in the actuator, and sends the information indicating that the door is not closed when the position of the pulley is associated with a door open position.

Another aspect includes a system for automatically closing a door of a vehicle. The system may include a door check connected between a body of the vehicle and the vehicle's door, a cable, and an actuator comprising a motor and a pulley, wherein a first end of the cable is attached to the door check and a second end of the cable is attached to the pulley, and the motor is configured to pull the second end of the cable around the pulley such that the first end of the cable causes the door check to be placed into a closed state.

In some embodiments the first end of the cable is attached to a connector on the door check.

In some embodiments the cable is a Bowden cable comprising an external housing and an internal cable.

In some embodiments the door check further includes a mount and the actuator further includes a cable housing.

In some embodiments a first end of the internal cable is attached to a connector on the door check and a second end of the internal cable is attached to the pulley.

In some embodiments a first end of the external housing is attached to the mount and the second end of the external housing is attached to the cable housing.

In some embodiments the pulley includes one or more internal teeth.

In some embodiments the actuator further comprises a hub, and wherein the hub includes one or more teeth.

In some embodiments the actuator further comprises an output shaft connected to the hub, and the motor is configured to pull the second end of the cable around the pulley such that the first end of the cable causes the door check to be placed into a closed state by rotating the output shaft such that the output shaft rotates the hub, and the one or more teeth of the hub engage with the one or more internal teeth of the pulley, thereby causing the pulley to rotate.

In some embodiments the motor is configured to pull the second end of the cable around the pulley such that the first end of the cable causes the door check to be placed into a closed state when a triggering signal is received.

In some embodiments the one or more door angle sensors may monitor the position of the pulley.

In some embodiments one or more motor angle sensors may monitor the position of the output shaft.

In some embodiments the actuator further comprises a hub and a friction disc, wherein the hub includes one or more pawls, the pulley includes one or more teeth, and wherein the motor is configured to pull the second end of the cable around the pulley such that the first end of the cable causes the door check to be placed into a closed state by rotating the output shaft such that the output shaft rotates the hub in a first direction, and the one or more teeth of the hub engage with the one or more internal teeth of the pulley, thereby causing the pulley to rotate.

In some embodiments the actuator is configured to engage the one or more pawls of the hub into the one or more teeth of the pulley when the friction disc provides a downward force on the one or more pawls while the output shaft rotates the hub in the first direction, and disengage the one or more pawls of the hub when the friction disc provides a downward force on the one or more pawls while the output shaft rotates the hub in the second direction.

BRIEF DESCRIPTION OF THE DRAWINGS

The present technology is illustrated by way of example, and not by way of limitation, in the figures of the accompanying drawings in which like reference numerals refer to similar elements including.

DETAILED DESCRIPTION

Overview

Figure 1:
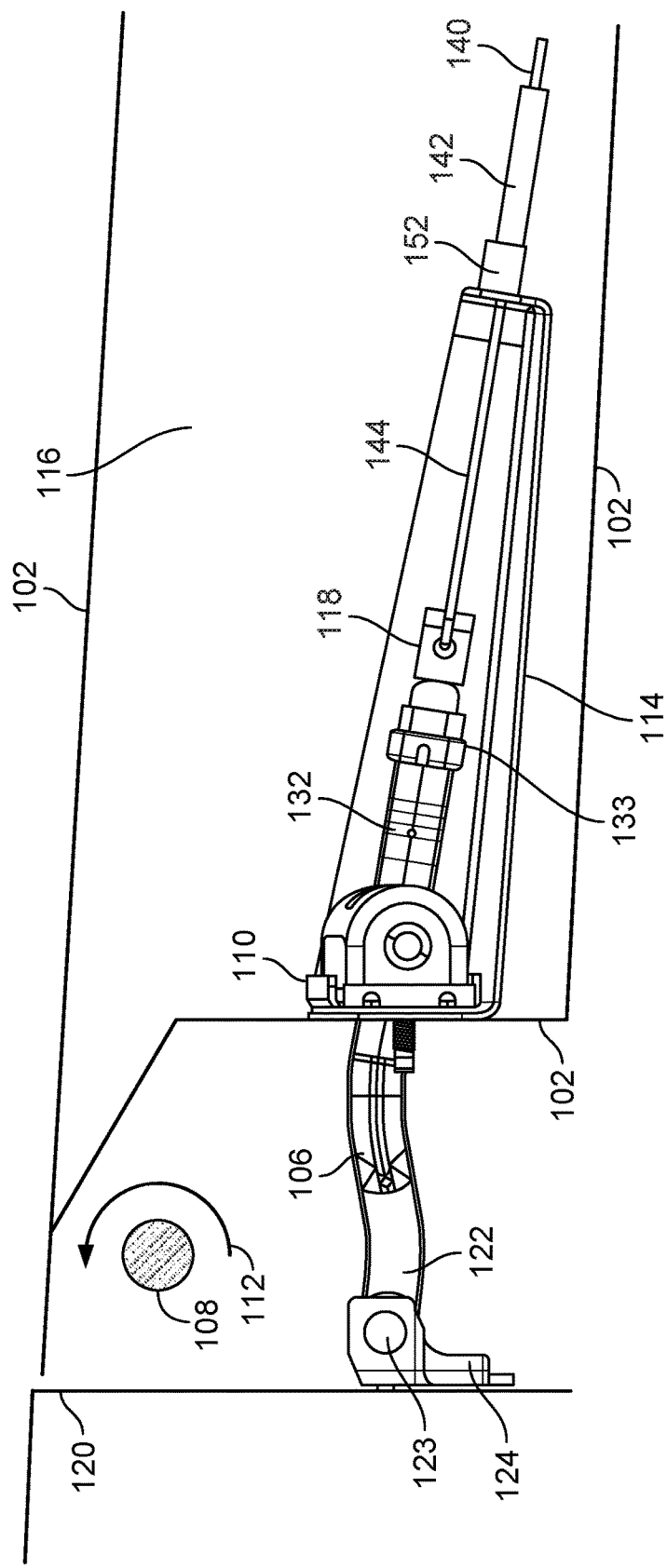
FIG. 1 is an example door check mounted to a vehicle and attached to a control cable in accordance with an embodiment.

The technology relates to assisting in the closing of a vehicle door by automatically pulling a door closed. For example, computing devices within a vehicle may determine that a door to a vehicle has been left open or only partially closed. When this is the case, the computing devices may trigger an actuator to pull a control cable attached to a door check connected between the body of a vehicle and the vehicle's door. When subjected to the pulling force of the control cable, the door check may be forced into a closed state, thereby causing the door to completely close.

Vehicle doors may be mounted to the body of the vehicle by the use of one or more hinges and door checks. For example, a door, such as a passenger side door of a vehicle, may be attached to the body of the vehicle by a hinge. The hinge may allow for the door to move freely, on an axis of rotation around the hinge, between an open or closed position, and intermediate positions there-between. In some embodiments more than one hinge may be used to mount the door to the body of the vehicle.

One or more door checks may be used to limit the range of motion of the door on the axis of rotation around the hinge. The door check may include a first end and a second end, and may be positioned into an open state, a closed state, and intermediate states in between. In this regard, the open, closed, and intermediate states may correspond to the position of the door while in the opened, closed, and intermediate positions, respectively. In some embodiments, the hinge and door check may be used to attach components other than doors of the vehicle, such as hoods, gas tank covers, trunks, etc. In some embodiments components such as doors, hoods, gas tank covers, trunks, etc., may be attached to the vehicle with any combination of door check, hinge, and other such attachment methods.

The door check may include a connector for attaching a control cable. In this regard, a connector may be attached to the first end of the door check positioned within the interior of the door. A control cable, such as a Bowden cable, may be removeably or permanently attached to the connector. In this regard the control cable may be connected to the connector via a weld, knot, screw, eye fitting, clamp, adhesive, or other such connection. In some embodiments the control cable may be permanently or removeably attached to a hinge or component (e.g., doors, hoods, gas tank covers, trunks, etc.).

The second end of the control cable may be connected to an actuator. For example, an actuator may be configured to accept the control cable through a cable housing and to connect an end of the control cable within a slot on a pulley. In some embodiments the actuator may be mounted within the interior of the door with a mounting bracket. In other embodiments the actuator may be mounted in proximate location to the vehicle door, whereby the control cable may be subjected to the pulling force by the actuator.

The actuator may be configured to place the door check into the closed state by providing a pulling force on the control cable. In this regard, the actuator may be configured to convert a motor's rotational force into a linear force. For example, the actuator may include a motor which provides a rotational force to sets of gears through multiple shafts. The gears may then provide an output rotational force to an output shaft. In some embodiments the actuator may include a power train including multiple gear stages and one or more sets of spur gears to transmit the rotation force provided by the motor to the output shaft.

The output shaft may be connected to a hub. When the actuator is not in operation, the hub may stay in a reset position. When the actuator is in operation the hub may rotate in a first direction to engage the pulley. In this regard, the hub may include one or more exterior teeth, which rotate the pulley by interlocking with one or more interior teeth on the pulley. The control cable may then be pulled around the pulley, causing the control cable to retract into the actuator. By doing such, a linear force may be applied on the door check by the control cable, thereby causing the door to close. In embodiments where the control cable is attached to a hinge or component directly, a linear force may be applied at the point of attachment, thereby causing the hinge or component to close.

When the actuator completes its operation of closing the door, the hub may return to the reset position. For example, the hub may rotate in a second direction opposite of the first direction until the hub returns to the reset position. The pulley may be connected to one or more springs which hold the pulley in place and maintain tension on the control cable when the hub returns to the reset position.

The actuator and control cable may be configured to have very little effect on the force necessary to operate the door manually. In this regard, the pulley may be connected to the one or more springs which assist in wrapping control cable around the pulley when the door is manually opened and closed. For example, when the door is opened the control cable may be pulled by the door check, causing the pulley to rotate in a direction which unwinds the control cable. When the door is closed, the tension placed on the spring when the door is opened may be released, causing the pulley to rotate the control cable back around the pulley.

Figure 16:
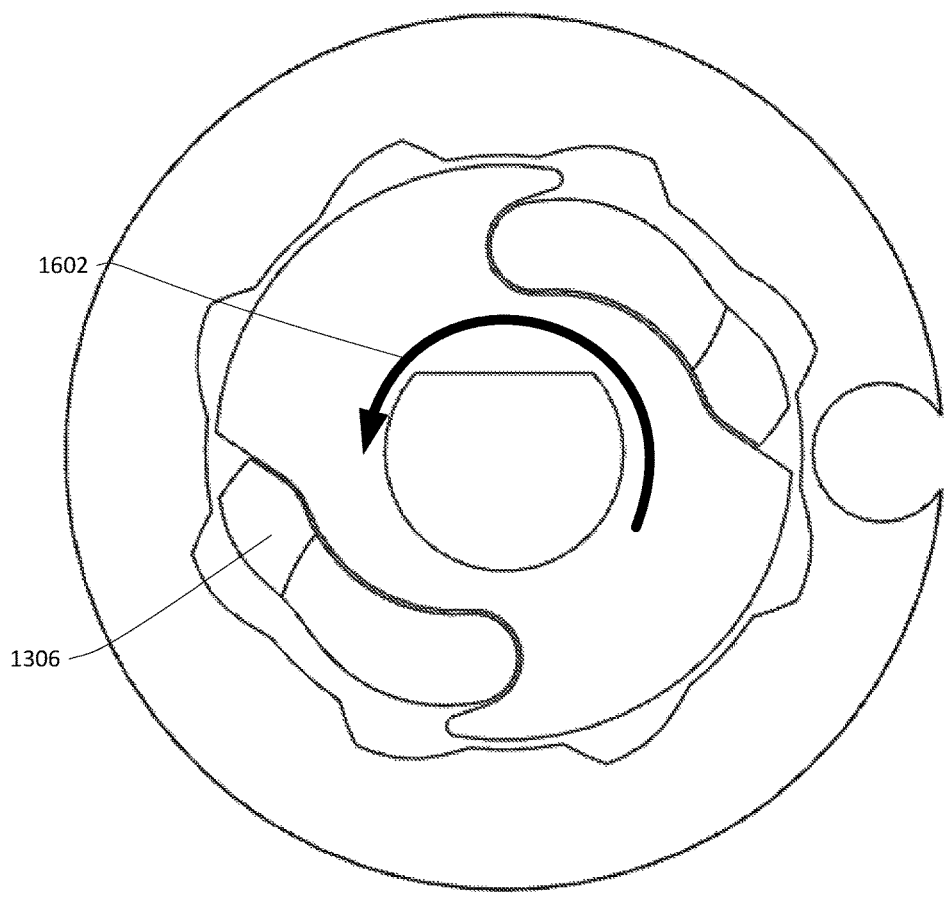

In some embodiments of the actuator, the hub may be implemented as part of a ratchet. For example, the hub may include one or more pawls which may engage with one or more teeth on the pulley. To engage the one or more pawls a friction disc may cause the one or more pawls to expand out of cutouts on the hub into the one or more teeth on the pulley when the hub rotates. In this regard, a friction pad may be pushed down onto the hub. When the ratchet rotates the one or more pawls may be subjected to a friction force from the friction pad, thereby causing the one or more pawls to expand to an outwards position. When the hub returns to the reset position, the one or more pawls may be subjected to the friction force in the opposite direction, thereby causing the one or more pawls to retract, as shown in FIG. 16. The pulley may freely rotate in either direction when not subjected to the friction force by the friction pad.

Computing devices within the vehicle may determine that the door of the vehicle was left open or in an intermediate position. In this regard, the vehicle may have a highly sophisticated vehicle computer system including a door assistance system which may include a plurality of sensors. Data from the plurality of sensors may be received and processed by the vehicle's central processor in real time in order to detect whether the door is open or closed. When the door assistance system detects that the door is open, a triggering signal may be sent to the actuator causing the actuator to close the door.

In some embodiments the actuator may include an overload release to prevent excessive force from being transmitted to the control cable. For example, a ring gear may be placed around one of the gear sets. The exterior of the ring gear may include a plurality of notches in which a tapered pawl may be positioned. When the ring gear is subjected to excessive force from the gear set, the tapered pawl may be released from one of the one or more notches allowing the ring gear to rotate in an opposite direction of the gear set. When the amount of force is reduced, a spring attached to the tapered pawl may push the tapered pawl into one of the one or more notches.

The features described herein may allow an autonomous vehicle to automatically close a door which was not fully closed by a passenger when they left the vehicle. By doing such, the autonomous vehicle may continue operation without the need for an individual to manually close the door. In addition these features may be used in both autonomous and non-autonomous vehicles to assure that all doors on a vehicle are closed fully before a car is able to be driven Example Systems While certain aspects of the disclosure are particularly useful in connection with autonomous vehicles, the vehicle may be any type of vehicle including, but not limited to, cars, trucks, busses, boats, airplanes, helicopters, recreational vehicles, amusement park vehicles, farm equipment, construction equipment, trams, golf carts, trains, and trolleys or any vehicles that utilize doors as discussed in further detail below.

Vehicle doors may be mounted to the body of the vehicle by the use of one or more hinges and door checks. For example, a door 102, such as a passenger side door of a vehicle, may be attached to the body of the vehicle 120 by a hinge 108, as shown as shown in FIG. 1. In this regard, the hinge 108 may allow for the door to move freely, on an axis of rotation around the hinge 108 (the axis of rotation being represented by arrow 112), between an open or closed position, and intermediate positions there-between. In some embodiments more than one hinge may be used to mount the door 102 to the body of the vehicle 120.

One or more door checks may be used to limit the range of motion of the door on the axis of rotation around the hinge. For example, a door check 106 may be connected to the body of the vehicle 120 and the interior of the door 116, as shown in FIG. 1. In this regard, the door check 106 may include a first end 132 and a second end 122. The second end 122 may be connected to a mounting post 124 via a rotatable connection point 123. Thus, the door check 106 may rotate around connection point 123 and be positioned into an open state, a closed state, and intermediate states in between. These open, closed, and intermediate states may correspond to the position of the door 102 while in the opened, closed, and intermediate positions, respectively.

The open state of the door check may be set by a stopper positioned on the door check. For example, as shown in FIG. 1, the first end 132 of the door check may include a stopper 133. When the door check 106 rotates around connection point 123, the door check 106 may slide through the door guide 110. When in the open state, the stopper 133 may contact the door guide 110, stopping further rotation of the door check 106 around the connection point 123. In some embodiments, the hinge 108 and door check 106 may be used to attach components other than doors of the vehicle, such as hoods, gas tank covers, trunks, etc.

The door check may include a connector and mount for attaching a control cable. In this regard, a connector 118 may be attached to the first end of the door check 132 positioned within the interior of the door 116, as shown in FIG. 1. The connector 118 may be welded, screwed, adhered, or otherwise attached to the door check 106. In some instances, the connector 118 may be integrally formed onto the door check 106. A mount 114 may be retrofitted around an existing door check using existing connection points, such as bolts holding the door check 106 to the door 102, or may be formed as an integral component of a door check.

A control cable may be attached to the door check. For example, a control cable 140, such as a Bowden cable comprised of an exterior housing 142 and interior cable 144 positioned within the exterior housing, may be attached to mount 114 and the connector 118, as shown in FIG. 1. In this regard, the mount 114 may include an attachment point 152 in which the exterior housing 142 of the first end of the control cable 140 may be inserted. The exterior housing 142 of the control cable 140 may be removeably or permanently attached to the attachment point 152 of the mount 114. Alternatively, the exterior housing 142 may attach directly to the mount 114. In some embodiments a belt or link chain may be used in place of the control cable.

An interior cable of the control cable may be attached to the connector. In this regard, the interior cable 144 of the control cable 140 may be connected to the connector via a weld, nipple connection, knot, screw, eye fitting, clamp, adhesive, or other such connection. As such, when the control cable 140 applies a force to the door check 106, the force is applied to the first end of the door check 132 by the interior cable 144, and the force generated by the exterior housing 142 may be resisted by mount 114. As such, there is minimal force transmitted through the door 102.

Figure 2:
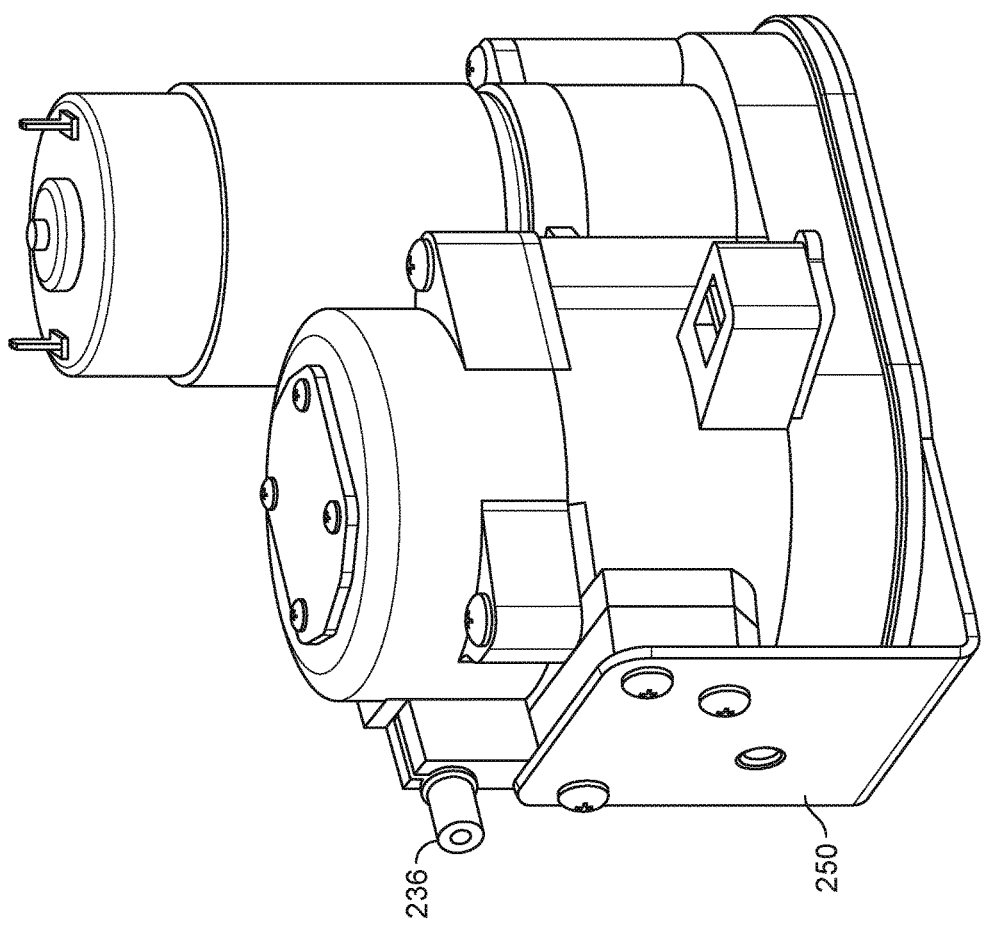
FIG. 2 is an image of an actuator in accordance with aspects of the disclosure.

The second end of the control cable may be connected to an actuator. For example, an actuator 202, such as the actuator shown in FIG. 2, may be configured to accept the control cable through a cable housing 236, and to connect an end of the control cable within a slot on a pulley (not shown). The cable housing 236 may permanently or removeably secure the exterior housing 142 of the control cable 140 while allowing an interior cable 144 to pass through into the interior of the actuator 202 and be attached to the pulley, as further described herein. In some embodiments the exterior housing 142 may cover some or all of the interior cable 144 from the mount 114 to the cable housing 236. In some embodiments the actuator may be mounted within the interior of the door 102 with a mounting bracket 250. In other embodiments the actuator may be mounted in proximate location to the vehicle door, whereby the control cable may be subjected to the pulling force by the actuator.

When the actuator 202 applies a force to the control cable 140, the force is applied to the interior cable 144, and is resisted by the mounting bracket 250. As such, the force of closing the door 102 is contained within the actuator 202, and little to no force is transmitted through the door 102.

Figure 3:
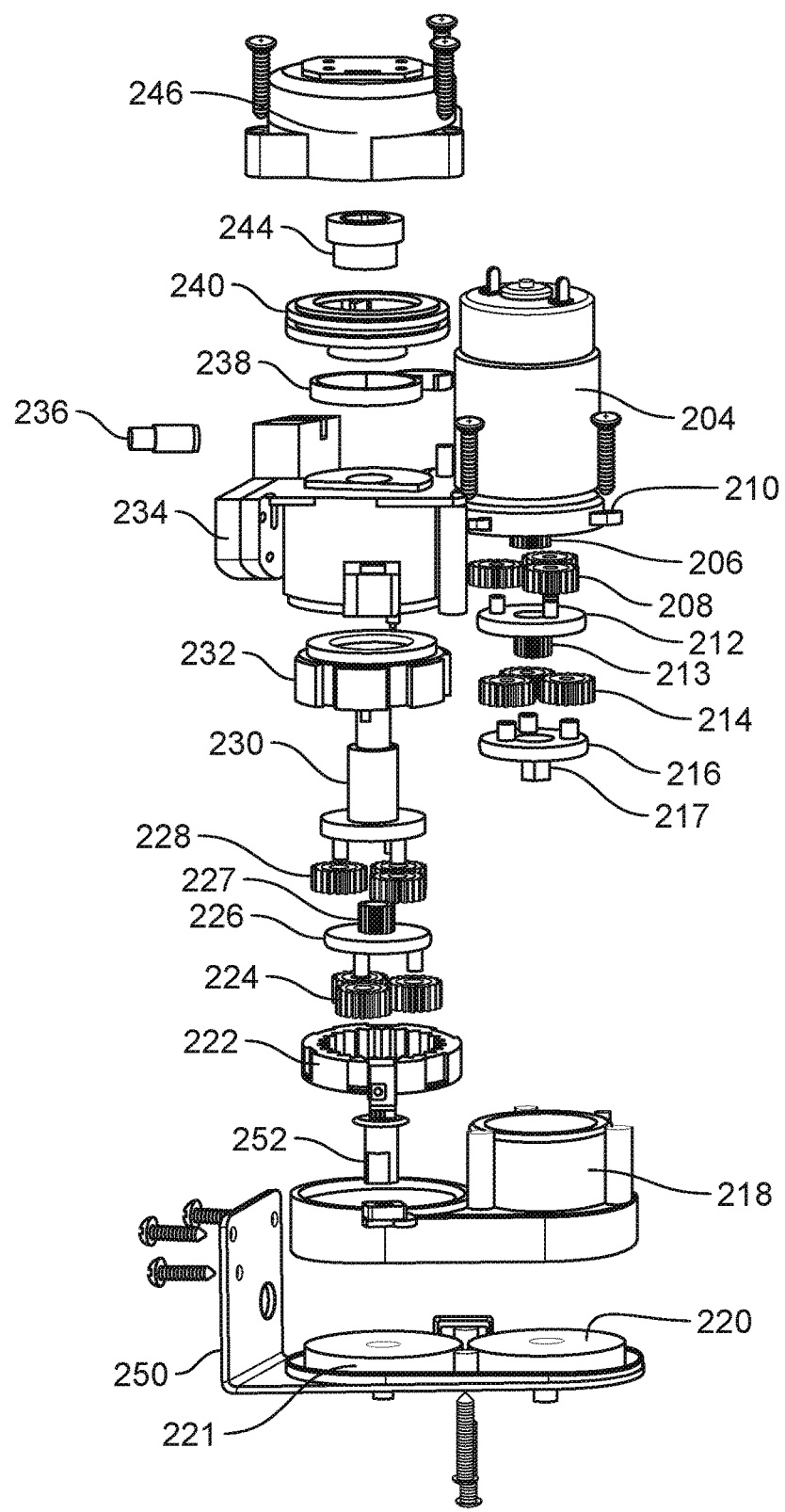
FIGS. 3-4 are an exploded perspective of the internal components of the actuator in accordance with aspects of the disclosure.
Figure 4:
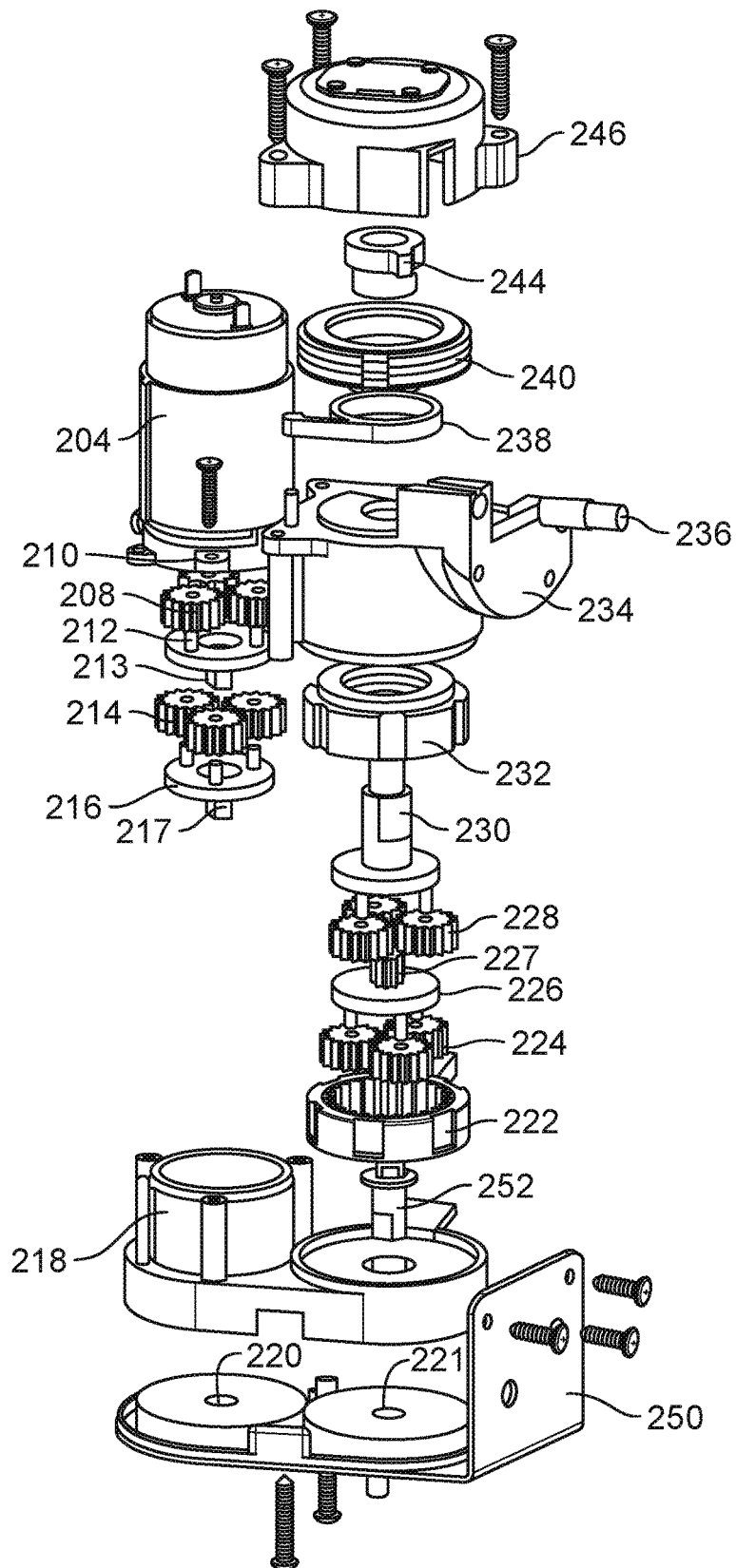

The actuator may be configured to place the door check into the closed state by providing a pulling force on the control cable. In this regard, the actuator may be configured to convert a motor's rotational force into a linear force. For example, as shown in FIGS. 3 and 4, the actuator 202 may include a motor 204 which provides a rotational force to sets of gears through multiple shafts. The gears may then provide an output rotational force to an output shaft. In some embodiments, the motor may operate at 4000 rotations per minute (RPM), or more or less.

The actuator may include a power train having multiple gear stages and a set of spur gears to transmit the rotation force provided by the motor 204 to the output shaft. As further shown in the exploded views of the actuator 202 in FIGS. 3 and 4, the gear stages and set of spur gears may be positioned within one or more gearboxes, such as gear boxes 218 and 234.

The output of the motor 204 may be connected to the first set of gears 208 that are connected to a second set of gears 214 via a first central gear 213. The second set of gears 214 may be connected to a first spur gear 220 via a first shaft 217. As an example, the gear ratio between the motor and the first set of gears may be 6:1, or more or less, and the gear ratio between the first set of gears and the second set of gears may be 6:1, or more or less.

The power train may further include a second spur gear 221 to receive the rotational force generated by the first spur gear 220. In some embodiments the gear ratio between the first spur gear 220 and the second spur gear 221 may be 1:1, or more or less. The second spur gear 221 may then drive a third and fourth set of gears, 224 and 228, respectively, and subsequently the output shaft 230, as further shown in FIGS. 3 and 4. For example, the second spur gear 221 may be connected to the third set of gears 224 via a pinion 252 which may include a third central gear to drive the third set of gears 224. The third set of gears 224 may be connected to a fourth set of gears 228 via a fourth central gear 227. The fourth set of gears 228 may be connected to the output shaft 230. The gear ratio between the second spur gear 221 and the third set of gears 224 may be 1:1, or more or less. The gear ratio between the third set of gears and the fourth set of gears may be 6:1, or more or less. The gear ratio between the fourth set of gears and the output shaft may be 6:1, or more or less. As such, the output shaft may operate at 3 rotations per minute (RPM), or more or less.

Each gear stage may be comprised of epicyclic gearing including a central gear, planet gears, and an outer ring gear. For example as shown in FIG. 3, a first gear stage may include a first set of gears 208 (i.e., planet gears). The first set of gears 208 may be positioned on a carrier 212, which may have a first central gear 213 at its base. A ring gear (not shown), may be positioned within gear box 218 or at the bottom housing 210 of the motor 204. A motor shaft (not shown) may include a central gear 206 which, when the motor 204 is activated, may rotate in a first direction. The central gear may cause the first set of gears 208 to rotate in a second, opposite direction, around the ring gear. The rotations of the first set of gears 208 may cause the carrier 212 to rotate in the first direction, causing a first central gear 213 to also rotate in the first direction. In some embodiments four or more or fewer gear stages may be used.

The output shaft 230 may be connected to a hub. For example, as shown in FIGS. 3 and 4, the hub 244 may be positioned within a pulley 240 and one or more springs 238. The hub 244, pulley 240, and one or more springs 238, may be enclosed within a housing 246. The output shaft 230 may be inserted into the hub 244, thereby enabling the actuator 202 to rotate the hub 244.

Figure 5:
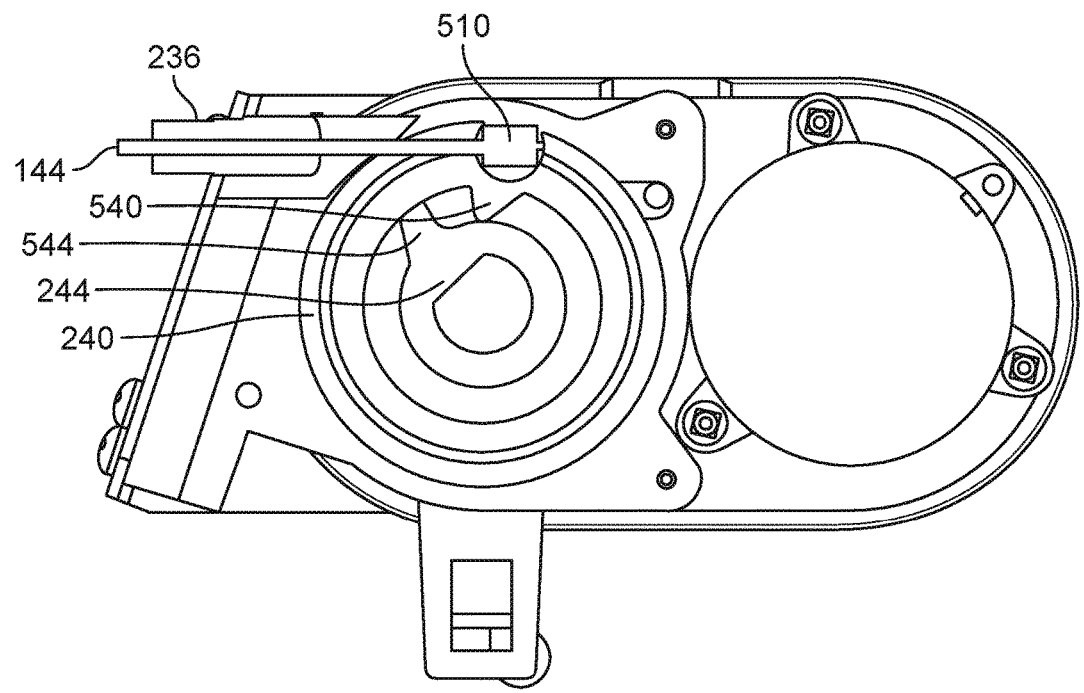
FIG. 5 is a cross-sectional view of an actuator in a reset position in accordance with aspects of the disclosure.

The hub may include one or more exterior teeth. For example, as shown in FIG. 5, the hub 244 may include one or more teeth, such as tooth 544, which may rotate the pulley 240 by interlocking with one or more interior teeth, such as interior tooth 540 on the pulley 240. The second end of the interior cable 144, attached to the pulley at cable attachment point 510, may be pulled around the pulley, causing the interior cable 144 of the control cable to retract into the actuator. By doing such, a linear force may be applied on the door check 106 by the control cable 140, thereby causing the door to close. In some embodiments the second end interior cable 144 may be removeably or permanently attached to the pulley via a weld, nipple connection, knot, screw, eye fitting, clamp, adhesive, or other such connection. In some embodiments a drum or crank arm may be used in place of a pulley.

The hub may stay in a reset position when the actuator is not in operation. For example, as shown in FIG. 5, when in the reset position the tooth 544 of the hub 244 remains disengaged from the interior tooth 540 of the pulley. As such, no force is applied by the actuator 202 on the control cable 140 while in the reset position.

When the door 102 is opened, or placed into an intermediate position, the position of the pulley may be adjusted. In this regard, when the door 102 is opened, or placed into an intermediate position, the door check 106 may pull on the first end of the interior cable 140 which is connected to the connector 118. The control cable 140 may then rotate the pulley 240 as the connector 118 of the door check 106 provides a pulling force on the first end of the interior cable 144 thereby providing a pulling force on the pulley 240 at the cable attachment point 510. As such, the interior cable 144 may be partially released from the interior of actuator 202 while the pulley 240 rotates into positions corresponding with the position of the door.

Figure 6:
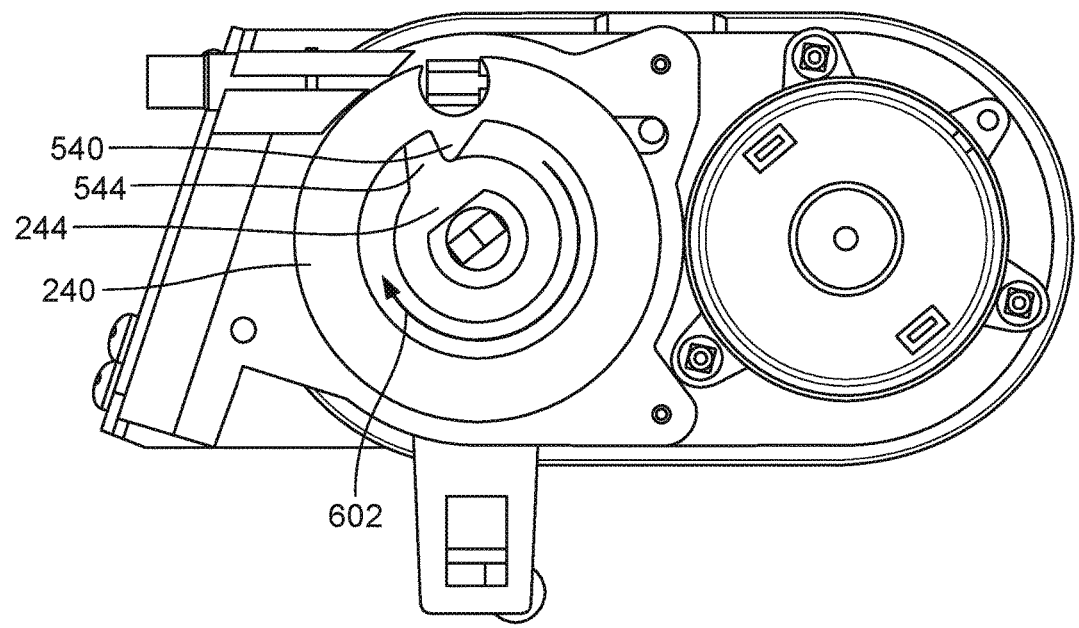
FIGS. 6-7 are cross-sectional views of a hub of an actuator engaging a pulley in accordance with aspects of the disclosure.

When the actuator is in operation the hub may rotate in a first direction to engage the pulley. For example, as shown in FIG. 6, when the actuator is activated the hub 244 may rotate in a first direction indicated by arrow 602. As the hub 244 rotates the tooth 544 of the hub 244 may engage with the interior tooth 540 of the pulley 240.

Figure 7:
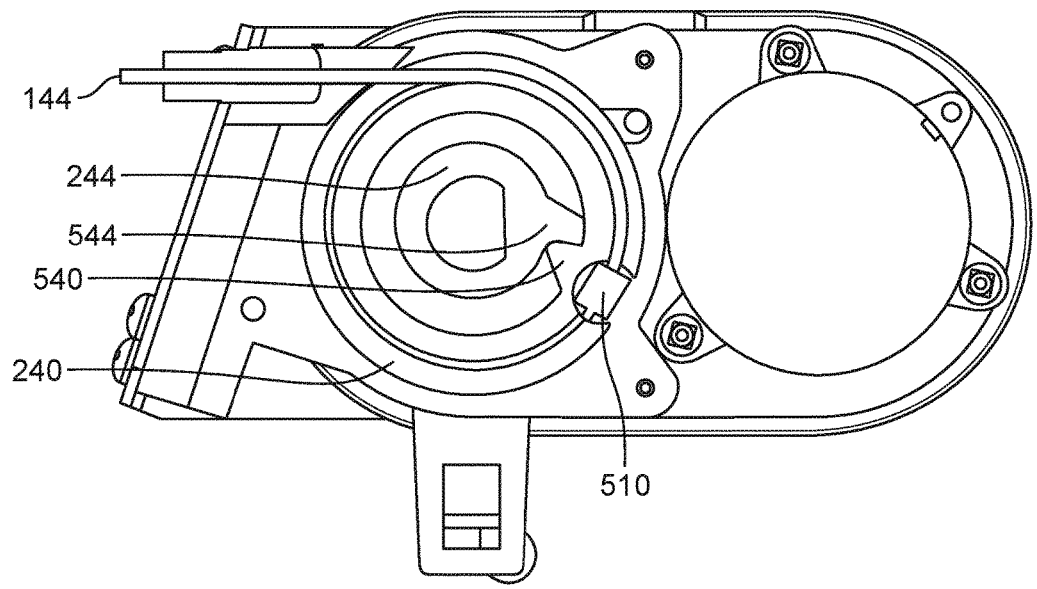

As the hub rotates, the interior cable may retract into the actuator. In this regard, as the hub 244 rotates, once the teeth contact one another, the pulley 240 may rotate a corresponding distance, as can be seen between FIG. 5, FIG. 6 and FIG. 7. In other words, once the tooth 544 is engaged with the interior tooth 544, the pulley 240 may rotate the same angular distance as the hub 244, thereby causing the second end of the interior cable 144 to wrap around the pulley 240 as the connection point 510 is rotated with the pulley.

Figure 8:
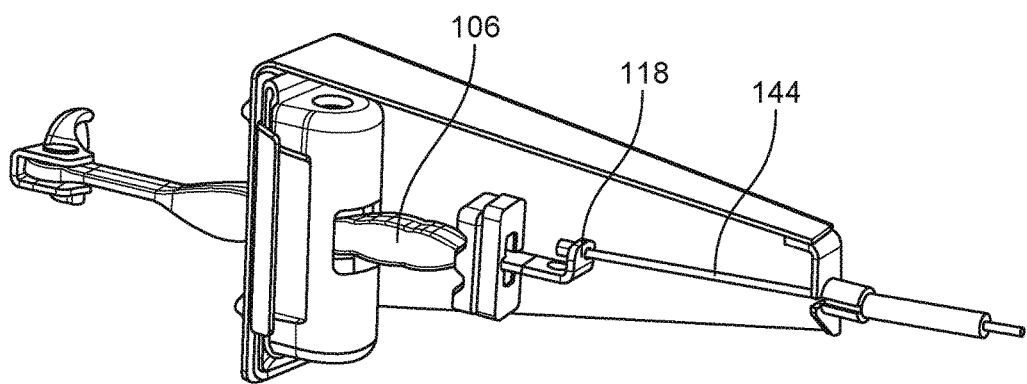
FIG. 8 is an image of a door check in a partially opened configuration in accordance with aspects of the disclosure.

As the hub rotates the pulley, linear force may be applied on the door check by the control cable. In this regard, as the second end of the interior cable 144 is wrapped around the pulley 240, a pulling force is applied to the door check 106 by the first end of the interior cable 144 at the connector 118, as shown in FIG. 8. As the pulling force is applied to the door check 106, the door check 106 is pulled through the intermediate states, toward the closed state. For example, as shown in FIG. 8, the door check 106 is in an intermediate position associated with an intermediate position of the door.

Figure 9:
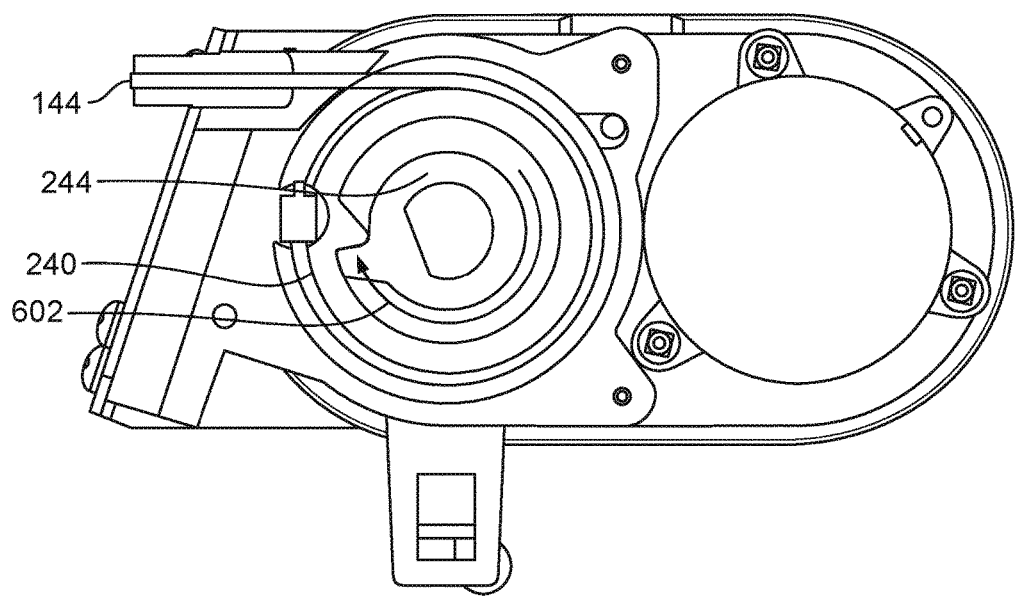
FIG. 9 is a cross-sectional view of a hub of an actuator engaging a pulley in accordance with aspects of the disclosure.
Figure 10:
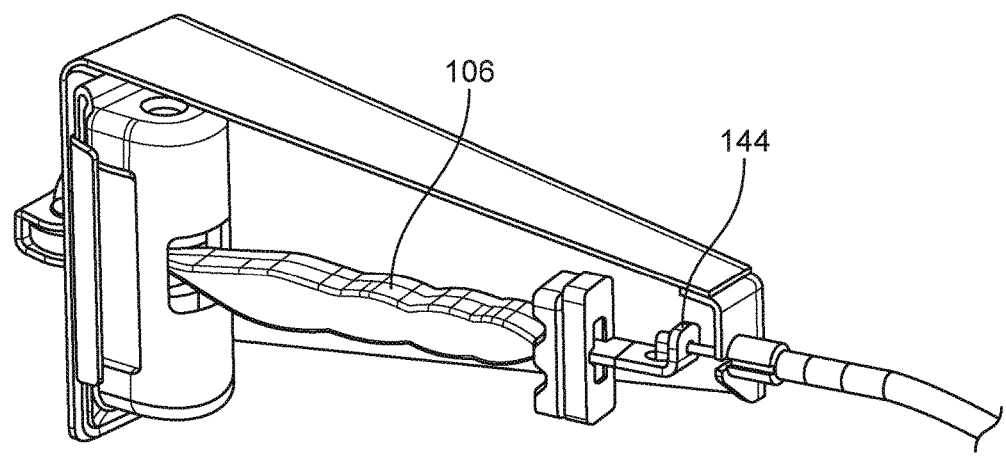
FIG. 10 is an image of a door check in a closed configuration in accordance with aspects of the disclosure.

The control cable may cause the door check to close the door. In this regard, the pulley 240, engaged with the hub 244, may cause the interior cable 144 to be rotated a predetermined distance around the pulley 240 in a first direction shown by arrow 602 in FIG. 9. The predetermined distance may be 270 degrees or more or less. The force generated at the first end of the interior cable 144 on the door check 106, upon the second end of the interior cable 144 rotating the predetermined distance, may be sufficient to place the door check into a closed state, as shown in FIG. 10. As such, the door 102 will be forced into a closed position corresponding to the closed state.

When the actuator completes its operation of closing the door, the hub may return to the reset position. For example, the hub may rotate in a second direction opposite of the first direction until the hub returns to the reset position, as shown in FIG. 5. The pulley may be connected to one or more springs 238, such as one or more clock springs, which hold the pulley 240 in place and maintain tension on the control cable 140 when the hub 244 returns to the reset position.

Figure 11:
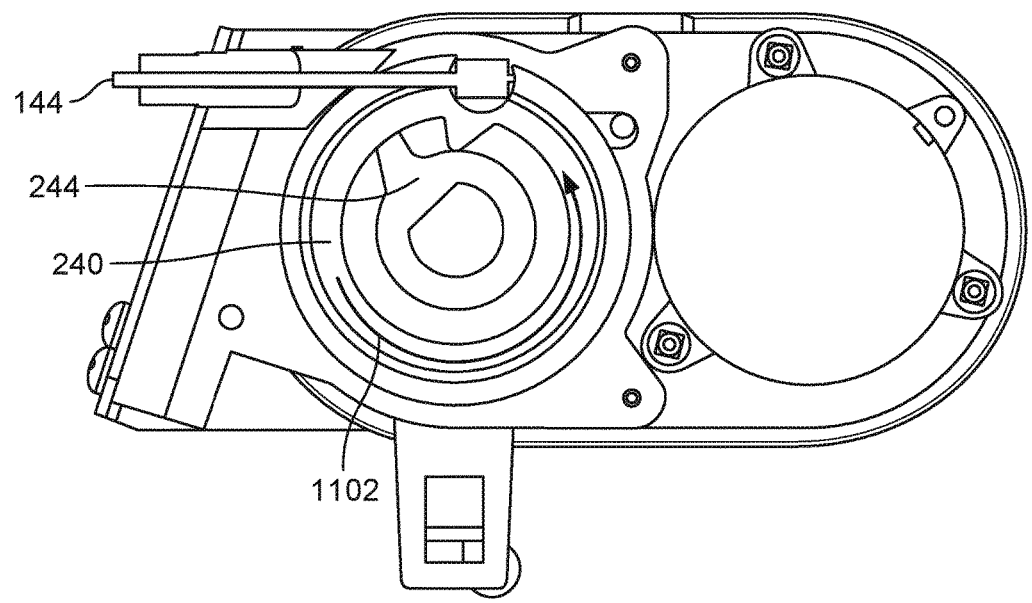
FIGS. 11 and 12 are cross-sectional views of an actuator while a door is being manually operated in accordance with aspects of the disclosure.
Figure 12:
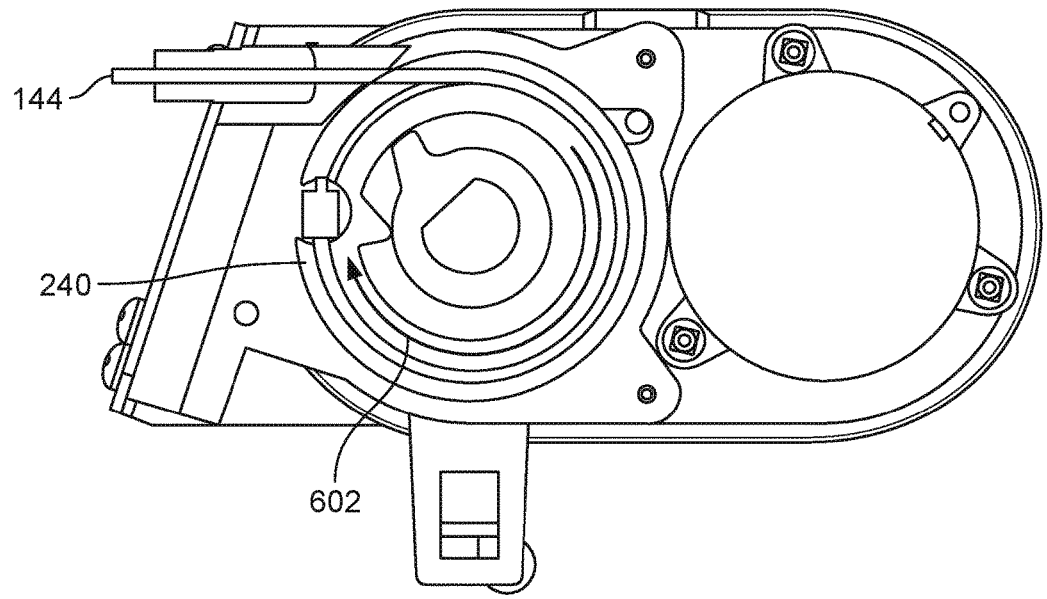

The actuator and control cable may be configured to have very little effect on the force necessary to operate the door manually. In this regard, the pulley may be connected to the one or more springs 238 which assist in unwrapping and wrapping the control cable around the pulley when the door is manually opened and closed, respectively, as shown in FIGS. 11 and 12. For example, when the door is manually opened the first end of the interior cable 144 may be pulled by the door check 106, causing the second end of the interior cable 144 to rotate the pulley 240 in a second direction shown by arrow 1102, as shown in FIG. 11. As the pulley 240 is rotated in the second direction shown by arrow 1102, the one or more springs 238 may be placed under tension as the interior cable 144 unwinds from the actuator 240.

The interior cable may be wrapped around the pulley when the door is manually closed. For example, when the door 102 is manually closed, the door check 106 may move through intermediate states to the closed state, releasing tension from the first end of the causing the tension placed on the pulley 240 by the one or more springs 238 to cause the pulley 240 to rotate in the first direction shown by arrow 602, as shown in FIG. 12. The one or more springs 238 may maintain tension on the pulley 240 while the pulley rotates and wraps the interior cable 144 around itself until the door reaches a closed position.

Figure 13:
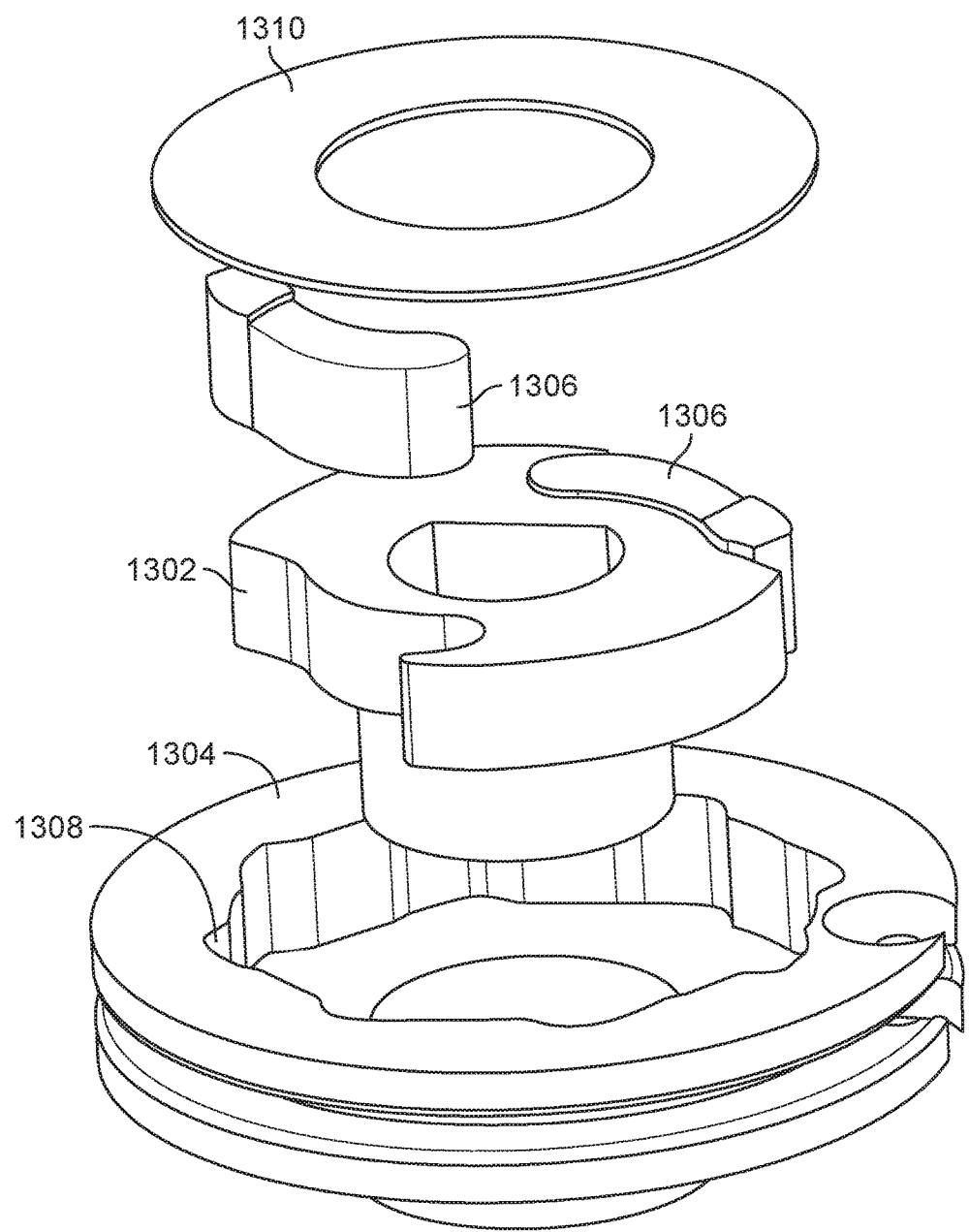
FIGS. 13-14 are perspective views of a hub, pulley, and friction plate in accordance with aspects of the disclosure.

In some embodiments of the actuator, the hub may be implemented as part of a ratchet. For example, as shown in FIG. 13 the ratchet hub 1302 may include one or more pawls 1306, which may be compared to hub 244 of FIG. 5. The one or more pawls 1306 may be positioned in cutouts on the ratchet hub 1302. The one or more pawls 1306 may engage with one or more teeth 1308 on the ratchet pulley 1304, which may be compared to the pulley 240 in FIG. 3, in response to a friction disc 1310 applying pressure to the one or more pawls 1306.

Figure 14:
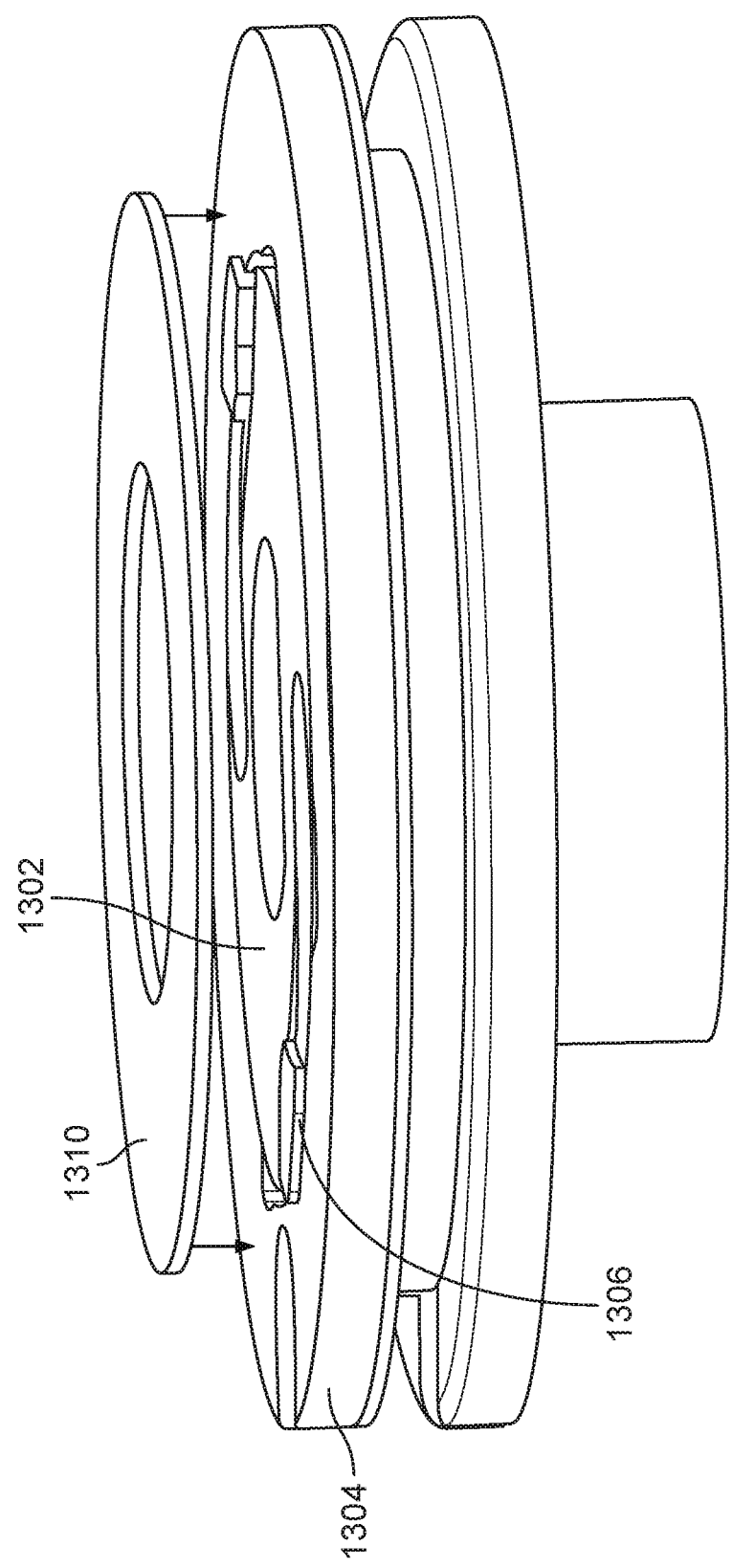
Figure 15:
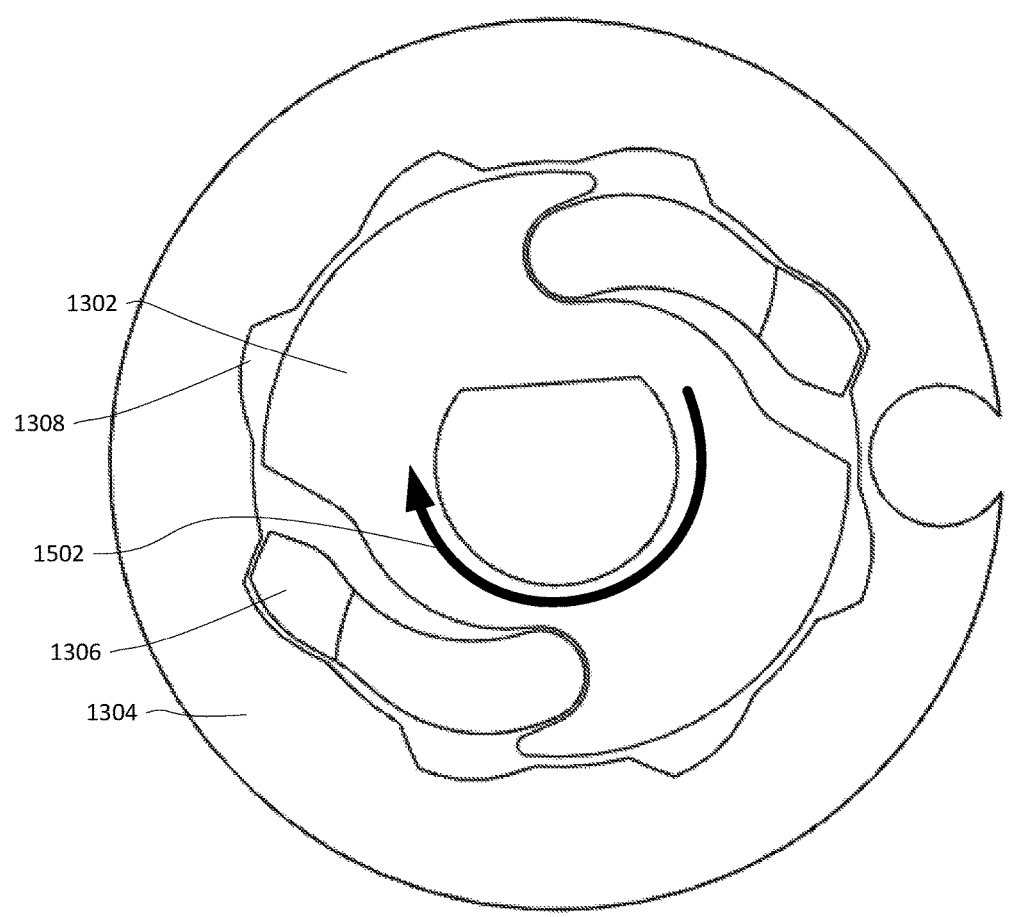
FIGS. 15 and 16 are images of a hub engaging with a pulley in accordance with aspects of the disclosure.

To engage the one or more pawls, a friction disc may cause the one or more pawls to expand into the one or more teeth on the ratchet pulley when the ratchet hub rotates. For example, as shown in FIG. 14, a friction disc 1310 may be pushed in a downward direction onto the ratchet hub 1302. When the ratchet hub 1302 rotates in an engagement direction shown by arrow 1502 the one or more pawls 1306 may be subjected to a friction force from the friction disc in a first direction 1502, thereby causing the one or more pawls 1306 to expand to an outwards position into the one or more teeth 1308, as shown in FIG. 15. As shown in FIG. 16, when the ratchet hub returns to the reset position, the one or more pawls 1306 may be subjected to a second friction force shown by arrow 1602, in the opposite direction of the friction force in the first direction 1502, thereby causing the one or more pawls 1306 to retract into the cutouts on the ratchet hub 1302. The ratchet pulley 1304 may freely rotate in either direction when not subjected to the friction force by the friction pad.

The ratchet hub may reset in any arbitrary position once the one or more pawls have retracted. As such, the reset position of the ratchet hub may be only a few degrees, such as 5 degrees or more or less in a second direction reverse from first direction 1502. Thus, the door can be manually operated with a shorter reset delay than when the hub 244 is used. Further, with the one or more teeth 1308 arranged in a pattern around the ratchet pulley 1304, re-engagement and initiation of door closing can happen from any door position with potentially less delay for the one or more pawls 1306 on the ratchet hub to rotate into engagement with the one or more teeth 1308 on the pulley.

Figure 17:
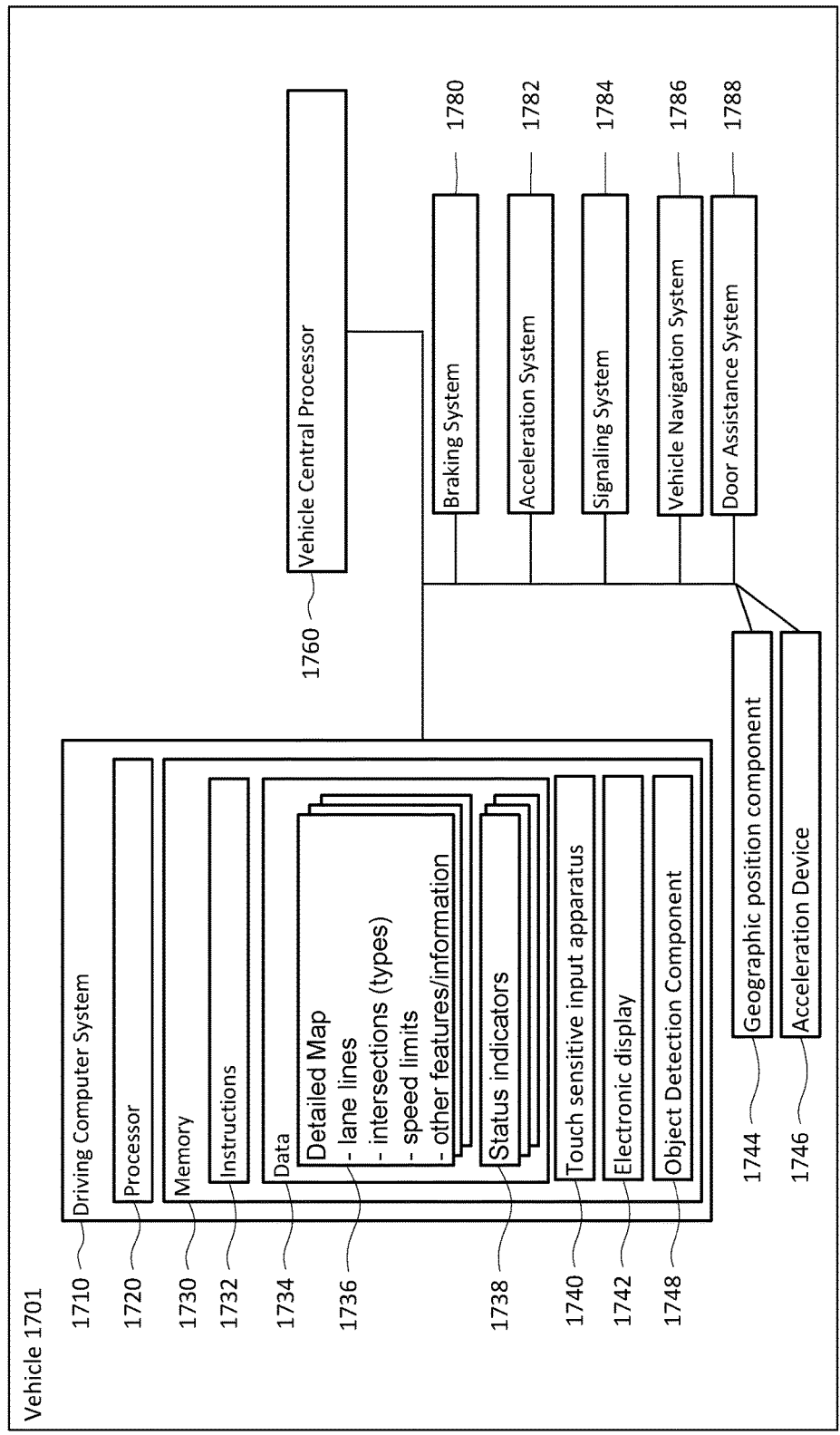
FIG. 17 is a functional diagram of a system in accordance with an embodiment.

Computers or computing devices within the vehicle may determine that the door of the vehicle was left open or in an intermediate position. In this regard, the vehicle may have a highly sophisticated vehicle computer system including a door assistance system which may include a plurality of sensors. For instance, as shown in FIG. 17, a driving system 1710 in accordance with one aspect of the disclosure includes a vehicle 1701 with various components. The vehicle may have one or more computers, such as computer 1710 containing a processor 1720, memory 1730 and other components typically present in general purpose computers.

The memory 1730 stores information accessible by processor 1720, including instructions 1732 and data 1734 that may be executed or otherwise used by the processor 1720. The memory 1730 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 1732 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 1734 may be retrieved, stored or modified by processor 1720 in accordance with the instructions 1732. For instance, although the claimed subject matter is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 1720 may be any conventional processor, such as commercially available CPUs. Alternatively, the processor may be a dedicated device such as an ASIC or other hardware-based processor. Although FIG. 17 functionally illustrates the processor, memory, and other elements of computer 1710 as being within the same block, it will be understood by those of ordinary skill in the art that the processor, computer, or memory may actually comprise multiple processors, computers, or memories that may or may not be stored within the same physical housing. For example, memory may be a hard drive or other storage media located in a housing different from that of computer 1710. Accordingly, references to a processor or computer will be understood to include references to a collection of processors or computers or memories that may or may not operate in parallel. Rather than using a single processor to perform the steps described herein, some of the components, such as steering components and deceleration components, may each have their own processor that only performs calculations related to the component's specific function.

In various aspects described herein, the processor may be located remote from the vehicle and communicate with the vehicle wirelessly. In other aspects, some of the processes described herein are executed on a processor disposed within the vehicle and others by a remote processor, including taking the steps necessary to execute a single maneuver.

Computer 1710 may all of the components normally used in connection with a computer such as a central processing unit (CPU), memory (e.g., RAM and internal hard drives) storing data 1734 and instructions such as a web browser, an electronic display 1742 (e.g., a monitor having a screen, a small LCD touch-screen or any other electrical device that is operable to display information), user input 1740 (e.g., a mouse, keyboard, touch screen and/or microphone), as well as various sensors (e.g., a video camera) for gathering explicit (e.g., a gesture) or implicit (e.g., "the person is asleep") information about the states and desires of a person.

In one example, computer 1710 may be an autonomous driving computing system incorporated into vehicle 1701. The autonomous vehicle may include all of the features of a non-autonomous vehicle.

The driving computing system may capable of communicating with various components of the vehicle. For example, computer 1710 may be in communication with the vehicle's central processor 1760 and may send and receive information from the various systems of vehicle 1701, for example the braking 1780, acceleration 1782, signaling 1784, navigation 1786, and door assistance 1788 systems in order to control the movement, speed, collision management, general operation, etc. of vehicle 1701. Each of these systems may include one or more processors and/or a dedicated computer configured similarly to computer 1710 (with one or more processors and memory storing data and instructions). The door assistance system 1788 may manage the position of the doors on the vehicle, by controlling one or more actuators. In addition, when engaged, computer 1710 may control some or all of these functions of vehicle 1701 and thus be fully or merely partially autonomous. It will be understood that although various systems and computer 1710 are shown within vehicle 1701, these elements may be external to vehicle 1701 or physically separated by large distances.

The vehicle may also include a geographic position component 1744 in communication with computer 1710 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The vehicle may also include other devices in communication with computer 1710, such as an accelerometer, gyroscope or another direction/speed detection device 546 to determine the direction and speed of the vehicle or changes thereto. By way of example only, acceleration device 1746 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 1710, other computers and combinations of the foregoing.

The computer 1710 may control the direction and speed of the vehicle by controlling various components. By way of example, if the vehicle is operating in a completely autonomous mode, computer 1710 may cause the vehicle to accelerate (e.g., by increasing fuel or other energy provided to the engine), decelerate (e.g., by decreasing the fuel supplied to the engine or by applying brakes) and change direction (e.g., by turning the front two wheels) based on detailed map information 1736 and input from the various components.

The vehicle may also include an object detection component 1748, for detecting objects external and internal to the vehicle such as other vehicles, obstacles in the roadway, traffic signals, signs, trees, pedestrians, passengers etc. The detection system may include lasers, sonar, radar, cameras or any other detection devices which record data which may be processed by computer 1710. For example, if the vehicle is a small passenger vehicle, the car may include a laser mounted on the roof or other convenient location.

Data from the plurality of sensors of the door assistance system 1788 may be received and processed by the computer 1710 and/or a dedicated computer of the door assistance system 1788 configured similarly to computer 1710 (with one or more processors and memory storing data and instructions), in real time in order to detect whether the door is open or closed. For instance, when the door assistance system 1788 detects that the door is open, a triggering signal may be sent to the actuator causing the actuator to close the door.

In some embodiments, a door entry sensor may determine whether a passenger or other foreign object is positioned between the door and the vehicle. In this regard, a door entry sensor 2102 may determine through the sensor data, telematics and/or visual data (e.g., camera/video/lidar images, etc.) that a passenger or foreign object is detected. This sensor may be incorporated into the perception system and/or the plurality of sensors of the door assistance system such that this information is provided to the door assistance system 1788. When a passenger or foreign object is a detected the door entry sensor 2102 may prevent the door assistance system from triggering the actuator to close the door.

Figure 18:
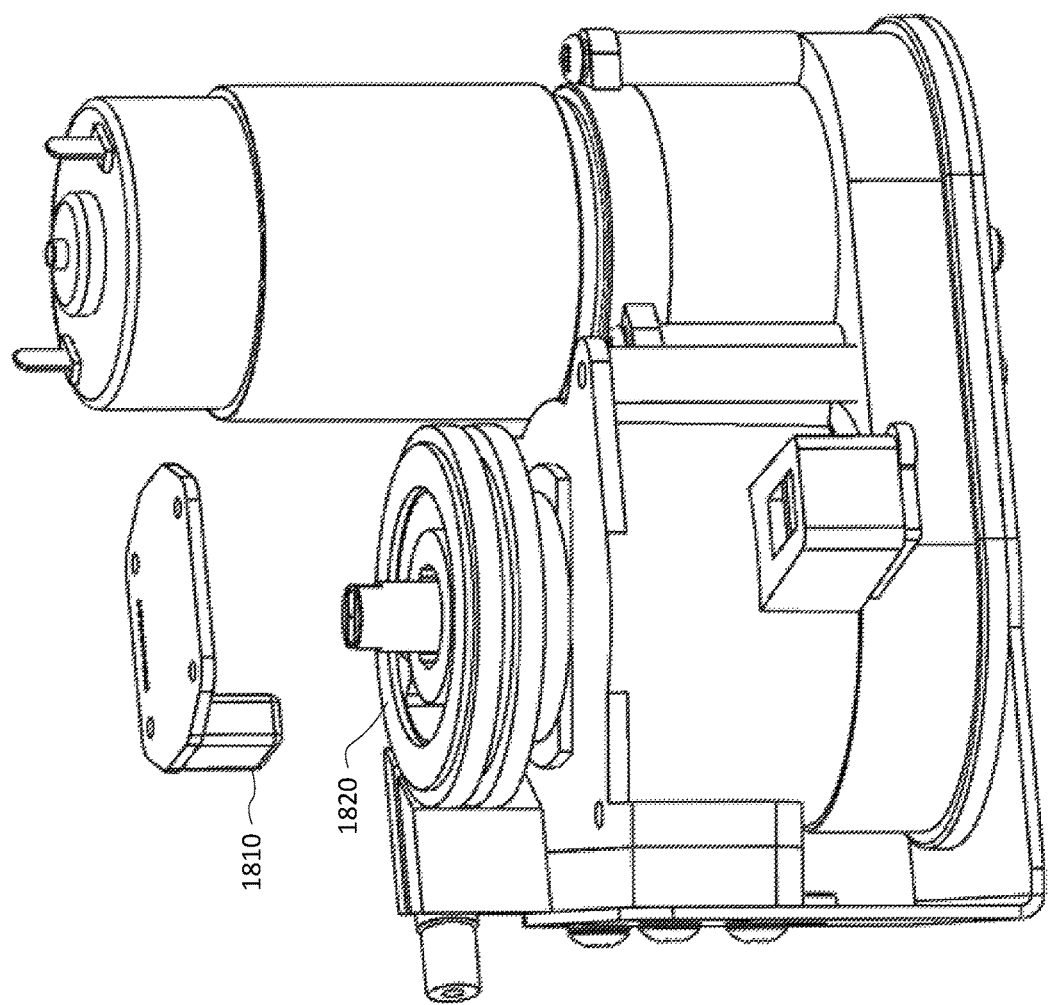
FIG. 18 is a perspective view of a door angle sensor in accordance with aspects of the disclosure.
Figure 19:
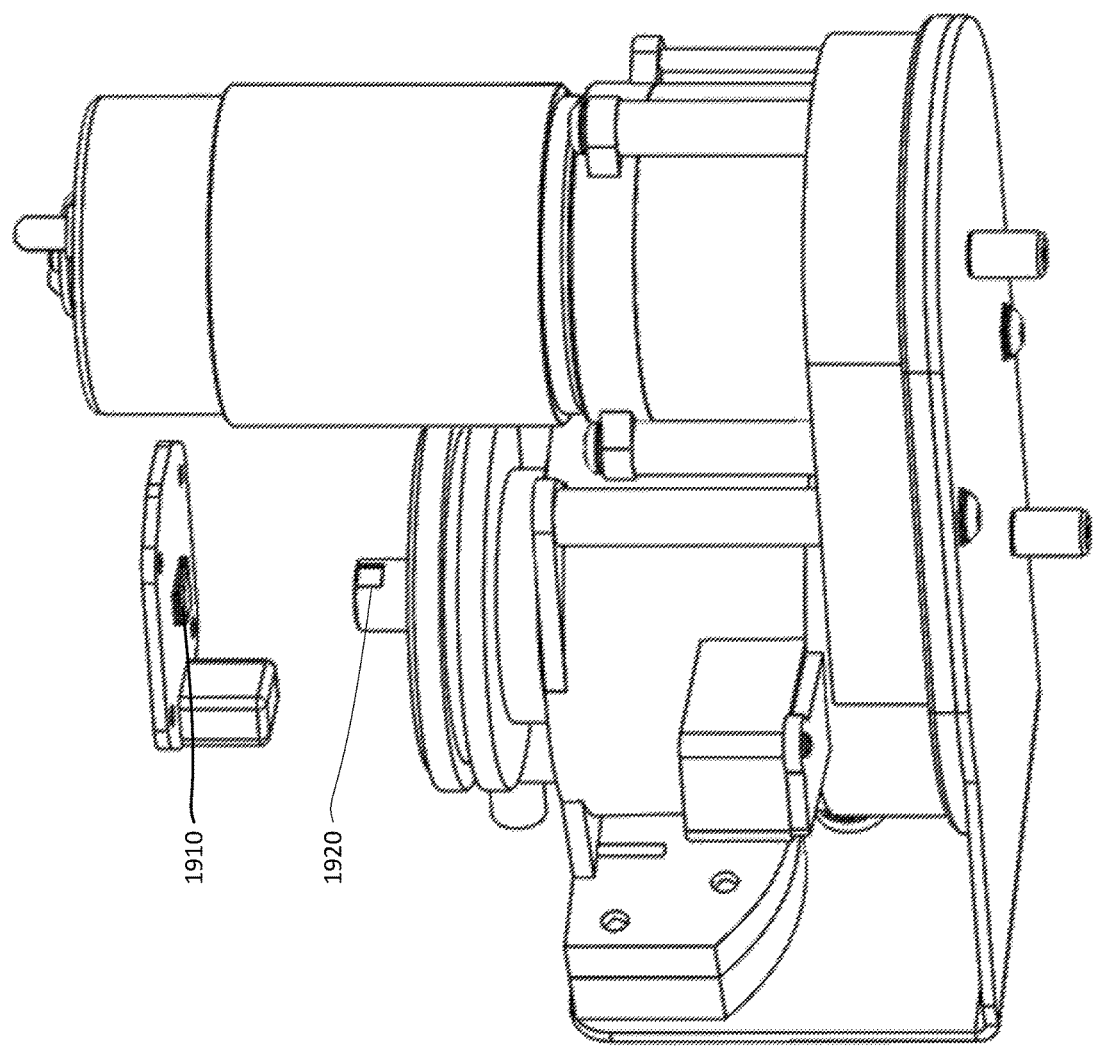
FIG. 19 is a perspective view of a motor angle sensor in accordance with aspects of the disclosure.

As an example, the plurality of sensors may include a door angle sensor, as shown in FIG. 18, and a motor angle sensor, as shown in FIG. 19. In this regard the door angle sensor 1810 may track the position of the pulley by tracking a magnet 1820 positioned within a sensor ring on the pulley, as shown in FIG. 18. By tracking the position of the magnet 1820 the door assistance system 1788 may be able to determine the position of the door. In some embodiments a door sensor may be placed near the door check 106 to monitor the position of the door. In this regard, the door sensor may provide further indication of the position of the door to verify the position determined by the door angle sensor.

In one instance, the motor angle sensor may determine the location of a magnet mounted to the output shaft. In this regard, the motor angle sensor 1910 may track a magnet within the output shaft 1920 to determine the position of the hub, as shown in FIG. 19. Based on the position of the hub the door assistance system 1788 may be able to determine the amount of rotation needed by the hub to close the door or to return to the hub to the reset position. Additionally, the door assistance system may be able to determine the speed and amount of power need to close the door based on the position of the hub. Based on the determined door position, amount of rotation, power, and/or speed, the door assistance system 1788 may send a control signal to the actuator 202 to control the closing of the door 102. The signal from the motor angle sensor 1910 may be used to infer the position of the door, eliminating or confirming the signal from the door angle sensor 1810.

The motor drive current can be measured while the door is being closed in relation to the measured door angle. In this regard, a current sensor may be used to detect the motor drive current while the door is being closed. The detected motor current may be used to determine if something is interfering with the normal door closing process. For example, if the detected current is greater than a predetermined value associated with a certain measured door angle, the door assistance system 1788 may determine that something is obstructing the closure of the door and terminate or reverse the door closing action. In some embodiments the detected current may be used with other information, such as the vehicle's orientation with respect to gravity, to adjust the predetermined value.

Figure 20B:
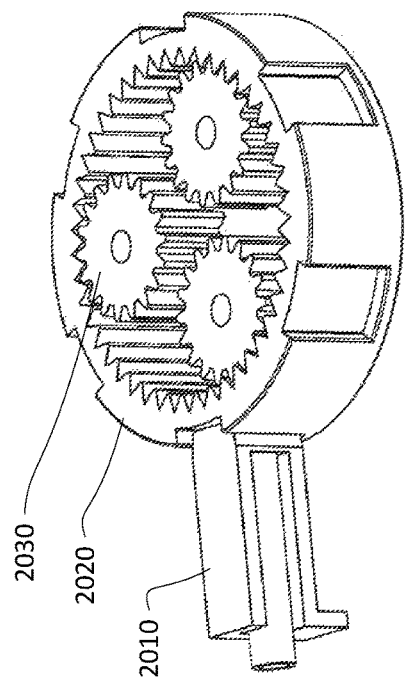
FIGS. 20A and 20B are a cross-sectional view of an overload release in accordance with aspects of the disclosure.
Figure 20A:
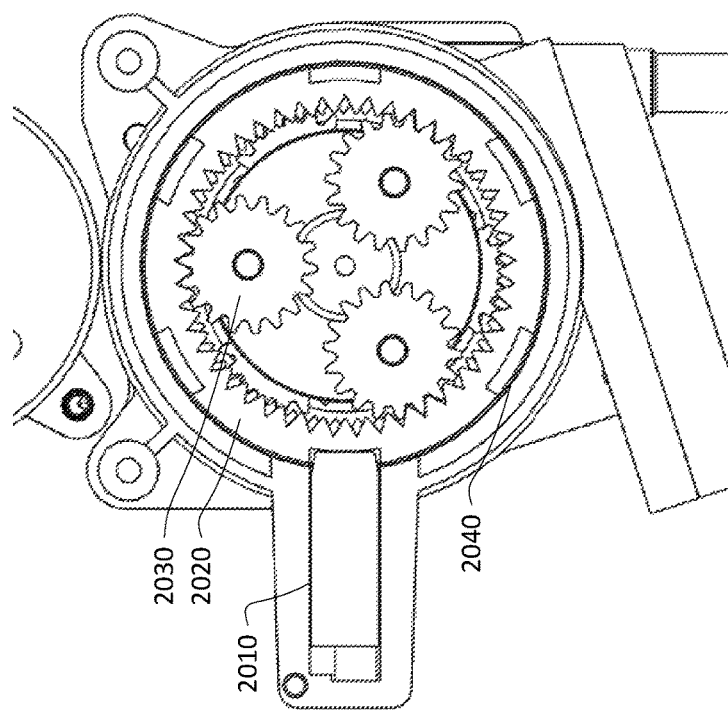

In some embodiments, the actuator may include an overload release to prevent excessive force from being transmitted to the control cable. For example, as shown in FIGS. 20A and 20B, a ring gear 2020 may be placed around one of the gear sets 2030, such as the third gear set. The exterior of the ring gear may include a plurality of notches 2040 in which a tapered pawl 2010 may be positioned. When the ring gear 2020 is subjected to excessive force from the gear set 2030, the tapered pawl 2010 may be released from one of the one or more notches 2040 allowing the ring gear to rotate in an opposite direction of the gear set. When the amount of force is reduced, a spring attached to the tapered pawl 2010 may push the tapered pawl into one of the one or more notches 2040, thereby allowing the gear set to rotate. In this regard, the tapered pawl acts as an overload release.

Example Methods

Data from the plurality of sensors of the door assistance system 1788 may be received and processed by the door assistance system in real time in order to detect and identify the operation characteristics of the vehicles doors. In this regard, the processors and/or computer of the door assistance system 1788 may use information from a one or more sensors of the perception system and/or the plurality of sensors of the door assistance system 1788 to monitor the amount of time a door is left open on vehicle 1701 and not obstructed by an object (such as a person, etc.).

When the amount of time the door is left open surpasses a predetermined value, such as thirty seconds, or more or less, the door assistance system may send a triggering signal to the actuator. The triggering signal may cause the actuator, such as actuator 202, to activate and close the door. In certain embodiments, sensors, such as cameras, lidar, radar, etc., may be used to determine if a passenger or object has entered or exited the vehicle. Upon determining that a passenger or object has entered or exited the vehicle, the amount of time the door is left open may be reset to zero.

Figure 21B:
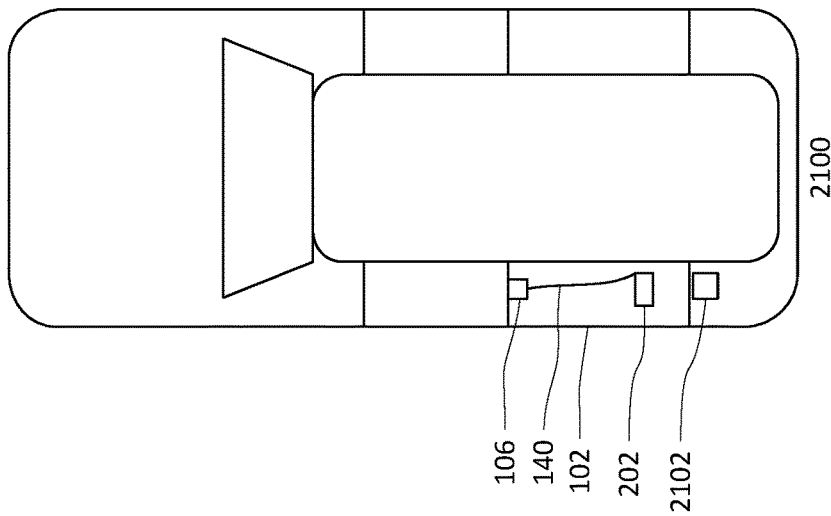
FIGS. 21A and 21B are illustrations of a vehicle including a system for closing a door.
Figure 21A:
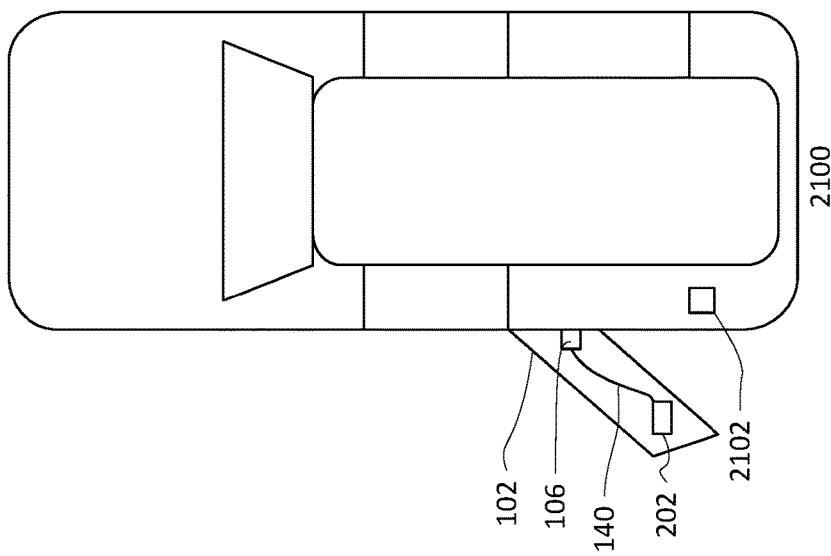

In some embodiments, data from the plurality of sensors of the door assistance system may be used to assist in closing the door. For example, as shown in FIG. 21A, a sensor, such as door entry sensor 2102, may monitor the doorway of a vehicle 2100. The door entry sensor 2102 may provide a signal to the door assistance system 1788 (not shown), indicating that the door 102 of the vehicle 2100 is in an open position. The door assistance system 1788 may send a triggering signal to the actuator 202, mounted in the interior of the door 102. When the actuator 202 receives the triggering signal, the actuator 202 may pull cable 140, which in turn pulls the door check 106, closing the door 102, as shown in FIG. 21B.

In some embodiments, the triggering signal to close the door may come from a source external to the door assistance system. For example, a remote triggering signal may be generated "manually" by a button, or other input, that a user, such as a driver or passenger of the vehicle may press. The remote triggering signal may then cause the door assistance system to trigger the actuator, or the remote triggering signal may directly trigger the actuator. In certain embodiments a voice command or visual command may generate the remote triggering signal. The triggering may also come remotely, such as from an individual, such as a dispatcher, or remote computer, as an over-the-air command. In this regard, a remote individual or computer may monitor the data from the vehicles sensors and determine that a door was left open. For example, the remote individual or computer may determine through the sensor data, telematics and/or visual data (e.g., camera/video/lidar images, etc.) that a door on the vehicle was left open. As such, the remote individual or computer may determine that it is safe to close the door based on a precise understanding of who's in and around the car, and when it's safe, rather than basing the actuation solely on a timer.

Figure 22:
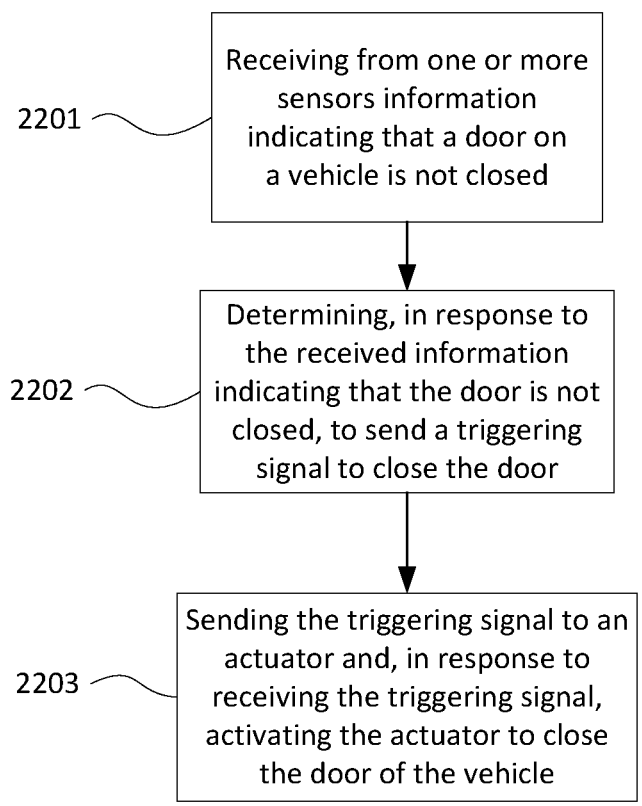
FIG. 22 is a flow diagram in accordance with an embodiment.

Flow diagram 2200 of FIG. 22 is an example of some of the aspects described above which may be performed by the door assistance system 1788. In this example, the door assistance system 1788 may receive, from one or more sensors, information indicating that a door on a vehicle is not closed, as shown in block 2201. In response to the received information indicating that the door is not closed, the door assistance system 1788 may determine to send a triggering signal to close the door, as shown in block 2202. Upon determining that a triggering signal should be sent, the door assistance system 1788 may send the triggering signal to an actuator and, in response to receiving the triggering signal, the actuator to close the door of the vehicle, as shown in block 2203.

The invention claimed is:

1. A system for automatically closing a door of a vehicle comprising:
    a door check connected between a body of the vehicle and the door of the vehicle;
    a cable; and
    an actuator comprising a motor and a pulley,
    wherein a first end of the cable is attached to the door check and a second end of the cable is attached to the pulley, and the motor is configured to pull the second end of the cable around the pulley such that the first end of the cable causes the door check to be placed into a closed state.

2. The system of claim 1 wherein the first end of the cable is attached to a connector on the door check.

3. The system of claim 1 wherein the cable is a Bowden cable comprising an external housing and an internal cable.

4. The system of claim 3 wherein the door check further includes a mount and the actuator further includes a cable housing.

5. The system of claim 4 wherein a first end of the external housing is attached to the mount and the second end of the external housing is attached to the cable housing.

6. The system of claim 3 wherein a first end of the internal cable is attached to a connector on the door check and a second end of the internal cable is attached to the pulley.

7. The system of claim 1 wherein the pulley includes one or more internal teeth.

8. The system of claim 7 wherein the actuator further comprises a hub, and wherein the hub includes one or more teeth.

9. The system of claim 8 wherein the actuator further comprises an output shaft connected to the hub; and
    wherein the motor is configured to pull the second end of the cable around the pulley such that the first end of the cable causes the door check to be placed into a closed state by rotating the output shaft such that the output shaft rotates the hub, and the one or more teeth of the hub engage with the one or more internal teeth of the pulley, thereby causing the pulley to rotate.

10. The system of claim 9 further comprising one or more door angle sensors for monitoring the position of the pulley.

11. The system of claim 9 further comprising one or more motor angle sensors for monitoring the position of the output shaft.

12. The system of claim 1 wherein the motor is configured to pull the second end of the cable around the pulley such that the first end of the cable causes the door check to be placed into a closed state when a triggering signal is received.

13. The system of claim 1 wherein the actuator further comprises a hub and a friction disc, wherein
    the hub includes one or more pawls;
    and the pulley includes one or more teeth,
    wherein the motor is configured to pull the second end of the cable around the pulley such that the first end of the cable causes the door check to be placed into a closed state by rotating the output shaft such that the output shaft rotates the hub in a first direction, and the one or more teeth of the hub engage with the one or more internal teeth of the pulley, thereby causing the pulley to rotate.

14. The system of claim 13, wherein the actuator is configured to engage the one or more pawls of the hub into the one or more teeth of the pulley when the friction disc provides a downward force on the one or more pawls while the output shaft rotates the hub in the first direction, and disengage the one or more pawls of the hub when the friction disc provides a downward force on the one or more pawls while the output shaft rotates the hub in the second direction.

* * * * *